UNITED STATES PATENT OFFICE 3,475,421
MONOACETYLENIC KETONIC COMPOUNDS,
THEIR USE AND PREPARATION
Roland Chretien and Francois d'Ogny, Paris, and Georges Wetroff, Le Thillay, France, assignors to Produits Chimiques Pechiney-Saint-Gobain, Neuilly-sur-Seine, France
No Drawing. Filed June 24, 1966, Ser. No. 560,096
Claims priority, application France, June 29, 1965, 22,738
Int. Cl. C09b 23/00; C07d 5/16, 5/20
U.S. Cl. 260—240                                    1 Claim

ABSTRACT OF THE DISCLOSURE

A ketonic compound having the general formula

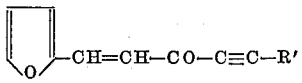

in which R' represents a lower alkyl or a radical having a single aromatic nucleus, which compound can be used as a parasiticide.

---

This invention relates to a group of ketonic compounds formulated to contain an acetylenic bond, an ethylenic bond, and one or more heterocycles having at least one heteroatom, and it relates to the process for the preparation of compounds of the type described and to their use as parasiticides.

In the U.S. application Ser. No. 534,658, filed Mar. 16, 1966, description is made of ketonic compounds and the method for preparation of same in which the compound contains two acetylenic bonds and one or more heterocycles. In the U.S. application Ser. No. 534,664, filed Mar. 16, 1966, description is made of ketonic compounds and their method of preparation wherein the ketonic compound contains at least one ethylenic bond and at least two acetylenic bonds.

The method of preparation and the antifungal activity of 1,5-diphenyl-4-pentene-1-yn-3-one and of 1-phenyl-4-hexene-1-yn-3-one are known; however, these compounds exhibit relatively low activity towards parasitic fungi such as *Plasmopara viticola* (vine-mildew), *Candida albicans*, *Scopulariopsis brevicaulis*, *Trichophyton interdigitale*, *Cercosporo melonis*, *Glomerella cingulata* and *Macrophomina phascoli*. In order to obtain an effectiveness with said compounds rather large dosages are necessary.

It is an object of this invention to produce and to provide a method for producing a group of ketonic compounds which have remarkable effect as parasiticides, in which the ketonic molecule contains an acetylenic bond, an ethylenic bond and one or more heterocyclic groups having at least one heteroatom and it is a related object to produce ketonic compounds of the type described.

Another object is to produce and to provide a method for producing ketonic compounds of the type described which are extremely efficient in inhibiting parasitic organisms, even when employed in low concentrations.

In accordance with the practice of this invention, the monoethylenic and monoacetylenic ketonic compounds containing one or more hetercycles having at least one heteroatom can be represented by the general formula:

R—CH=CH—CO—C≡C—R' in which R and R' each represent a five-membered ring, a six-membered ring or a fused ring heterocyclic residue containing at least one heteroatom such as oxygen, sulphur and nitrogen, and which may be unsubstituted or substiuted with groups such as alkyl, acyl, halogeno, trihalogenomethyl, hydroxyl, alkoxy, amino, amido, dialkyl-amino, dialkylamido, or nitro groups, in which the alkyl group can be represented by groups having from 1 to 18 carbon atoms such as ethyl, methyl, propyl, butyl, octyl and the like, and in which the halogeno groups may be represented by chlorine, fluorine, bromine, iodine and the like; in which R' can also represent an alkyl group of the type described or an aromatic radical with a single or condensed ring such as phenyl, indenyl, naphthyl, or anthracenyl and the like, in which the aromatic nucleus can be substituted by alkyl, acyl, halogeno, trihalogeno, trihalogenomethyl, hydroxyl, alkoxyl, amino, amido, dialkylamino, dialkylamido, or nitro groups as described above.

Amongst the heterocyclic residues are groups containing at least one oxygen atom, as represented by those derived from furan, pyran and coumarone; groups comprising at least one atom of sulphur, as represented by those derived from thiophene, thiopyran and thiocoumarone; groups comprising at least one nitrogen atom as represented by those derived from pyrrole, pyridine, indole, quinoline, imidazole, pyrazole, triazole, tetrazole, diazines, triazines, and tetrazines; and the groups comprising several different heteroatoms such as those derived from oxazole, thiazole and furazan.

Among the various compounds corresponding to the general formula, mention is made particularly of 1-(2-furyl)-5-phenyl-1-pentene-4-yn-3-one (I), 1-(2-furyl) - 1-hexene-4-yn-3-one (II) and 1-(2-furyl)-1-heptene-4-yn-3-one (III) having respectively the following formulate:

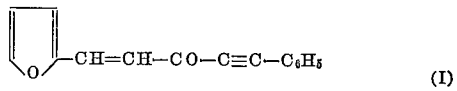 (I)

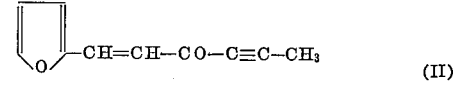 (II)

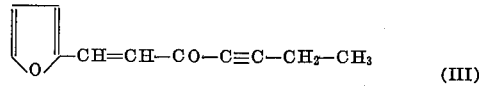 (III)

It has been found that different parasiticidal activity results from the combination in the compound of at least one heterocycle with a ketone function, the one acetylenic bond and the ethylenic bond whereby the compounds of this invention find efficient use as a parasiticide.

The acetylenic ketones of this invention can be obtained by oxidation of the corresponding alcohols, as by the means of an oxidizing agent such as chromic anhydride or active manganese dioxide. The corresponding alcohols can be obtained by various methods, notably: (a) by the action of the alpha-ethylene aldehydes on lithium or sodium derivatives of true acetylenes, in liquid ammonia or in other convenient solvent; (b) by the action of the alpha-ethylenic aldehydes on the magnesium derivatives of the true acetylenes.

The monoethylenic and monoacetylenic ketonic compounds containing one or heterocycles, and particularly the 1 - (2 - furyl) - 5-phenyl-1-pentene-4-yn-3-one, 1-(2-furyl)-1-hexene - 4 - yn - 3 - one and 1-(2-furyl)-1-heptene-4-yn-3-one, are active as antifungals, especially towards *Candida, albicans, Tichophyton interdigitale, Sabouraudites audouini, Scopulariopsis brevicaulis, Fusarium vasinfectum, Cercospora melonis, Aspergillus niger, Plasmopara viticola, Glomerella cingulata* and *Macrophomina phascoli*.

The ketonic compounds of this invention can be used alone or they can advantageously be mixed with other microbicides. They can be formulated for use in a solvent system, such as acetone, benzene, chlorobenzene or chloroform, or they can be formulated for use as a powder, either in the pure state or mixed with an inert carrier, such as talc, sand, and kaolin. The compounds can also be formulated into pastes or pomades.

The following examples are given by way of illustration, but not by way of limitation, of the preparation and use of compounds embodying the features of this invention:

EXAMPLE 1

(A) Preparation of 1-(2-furyl)-5-phenyl-1-pentene-4-yn-3-one.—20.4 g. of phenylacetylene, dissolved in 25 ml. of ether, are reacted on magnesium ethyl bromide prepared from 5.5 g. of magnesium and 27.2 g. of ethyl bromide in 200 ml. of anhydrous ether. After the addition, it is heated to reflux temperature for 2 hours. When the evolution of ethane ceases, it is cooled and, at ambient temperature, 24.4 g. of furylacrolein dissolved in 200 ml. of ether are slowly added and heated to reflux for one hour.

The product is hydrolyzed with a saturated aqueous solution of ammonium chloride while cooling the reaction flask with ice. It is extracted with ether and the ethereal solution is washed with water, dried over sodium sulfate and the ether is distilled off. 33.7 g. of raw 1 - (2 - furyl)-5-phenyl-1-pentene-4-yn-3-ol are obtained corresponding to a yield of 75% by weight of theory.

The 33.7 g. of the raw compound are dissolved in 100 ml. of acetone and the solution is progressively added to a suspension of 337 g. of active $MnO_2$ in 3.37 liters of acetone. The mixture is agitated for 8 hours at room temperature and then filtered. The filtrate is dried on sodium sulfate and the solvent is distilled off.

After recrystallization of the residue in petroleum ether, 10.8 g. of the compound 1-(2-furyl)-5-phenyl-1-pentene-4-yn-3-one, having a melting point of 53° C., are obtained corresponding to a yield of 32% by weight of theory.

(B) The antifungal activity of the 1-(2-furyl)-5-phenyl-1-pentene-4-yn-3-one obtained in Example 1–A has been determined on *Plasmopara viticola*, parasitic fungi of vine.

The culture medium of the fungi is formulated of vine leaves maintained on survival and inoculated with drops of conidies aqueous suspension containing the product to be examined in proportions ranging from 1/100,000 to 1/10,000,000.

A control sample was prepared with the aid of the same conidies suspension but which is free of any of the product. After 48 hours of incubation at 18–21° C., the inoculum drops are taken off by agitation of the vine leaves and again put into incubation at 18–21° C. After 7 days of incubation, the leaves are examined.

For purposes of comparison, identical tests were carried out with 1,5-diphenyl-4-pentene-1-yn-3-one and 1-phenyl-4-hexene-1-yn-3-one.

The minimal concentrations of compound which are effective completely to inhibit the *Plasmopara viticola* growth after 7 days of incubation at 18–21° C. were as follows:

1-(2-furyl)-5-phenyl-1-pentene-4-yn-3-one: 5/10,000,000
1,5-diphenyl-4-pentene-1-yn-3-one: 1/1,000,000
1-phenyl-4-hexene-1-yn-3-one: 5/1,000,000

The foregoing results establish that the antifungal activity of the 1-(2-furyl)-5-phenyl-1-pentene-4-yn-3-one is twice as great as that of 1,5-diphenyl-4-pentene-1-yn-3-one and ten times greater than that of 1-phenyl-4-hexene-1-yn-3-one.

EXAMPLE 2

(A) Preparation of 1-(2-furyl)-1-hexene-4-yn-3-one.—The magnesium derivative of propyne is first prepared by bubbling, at room temperature, propyne into an ethereal solution of magnesium ethyl bromide obtained from 6.9 g. of magnesium, 34 g. of ethyl bromide and 350 ml. of anhydrous ether.

A return condenser, cooled with acetone-Dry Ice, refluxes the propyne but permits the evolution of the ethane. When the gas emission is over, the excess propyne is driven off. 30.5 g. of furylacrolein, dissolved in 300 ml. of ether, are slowly added at room temperature, the mixture is heated at reflux for 2 hours and then the mixture is hydrolyzed with a solution saturated with ammonium chloride while being cooled with a salt-ice bath.

The mixture is extracted with ether and the ethereal solution is washed with water, dried on sodium sulfate, and then the ether is distilled off. 40.4 g. of raw 1-(2-furyl)-1-hexene-4-yn-3-ol are obtained corresponding to the theoretical yield.

40.5 g. of the product, in solution in 100 ml. of acetone, are slowly added to a suspension of 400 g. of active $MnO_2$ in 4 liters of acetone previously distilled over $MnO_4K$. The mixture is agitated at room temperature for 8 hours and then filtered. The filtrate is dried on sodium sulfate and the solvent is eliminated. The raw ketone is purified by evaporation under vacuum, then by recrystallization in petroleum ether. 15.7 g. of 1-(2-furyl)-1-hexene-4-yn-3-one, having a melting point of 44° C., are obtained corresponding to a yield of 39% by weight of theory.

(B) The antifungal activity of 1-(2-furyl)-1-hexene-4-yn-3-one was evaluated on *Plasmopara viticola* in accordance with the procedure described in Example 1–B, and on *Candida albicans*, *Scopulariopsis brevicaulis* and *Trichophyton interdigitale*, in accordance with the following technique:

The culture medium is formulated of 100 ml. of Sabouraud medium gelosed at 2% previously sterilized in an autoclave at 110–120° C. for 20 minutes. At the outlet of the autoclave, introduction into the medium is made of 0.5 ml. of acetone containing the active compound in proportions ranging from 1/1,000 to 1/10,000,000 by weight relating to the culture medium. It is carefully mixed and the different preparations are poured into previously sterilized Petri dishes. One control sample is prepared containing the Sabouraud medium with 0.5 ml. of acetone per 100 ml. of medium being added.

After cooling, the dishes are implanted with approximately equal quantities of mycelium, taken from stock culture. They are put in a dry oven at 28° C. The Petri dishes were examined after 10 days of incubation at this temperature.

As a comparison and to illustrate the merits of this invention, identical tests were also carried out with 1,5-diphenyl-4-pentene-1-yn-3-one and with 1-phenyl-4-hexene-1-yn-3-one as the active ingredient.

Determinations were made of the minimal concentration of active compound required completely to inhibit the growth of *Plasmopara viticola* after 7 days of incubation at 18–21° C. and with the other microorganisms after 10 days of incubation at 28–30° C. These determinations are set forth in the following table:

| | Minimal concentrations of— | | |
|---|---|---|---|
| Parasites | 1-(2-furyl)-1-hexene-4-yn-3-one | 1,5-diphenyl-4-pentene-1-yn-3-one | 1-phenyl-4-hexene-1-yn-3-one |
| *Plasmopara viticola* | 5/10,000,000 | 1/1,000,000 | 5/1,000,000 |
| *Candida albicans* | 1/10,000 | >1/1,000 | 1/4,000 |
| *Scopulariopsis brevicaulis* | 1/20,000 | >1/1,000 | 1/4,000 |
| *Trichophyton interdigitale* | <1/80,000 | >1/1,000 | 1/40,000 |

It will be seen that the antifungal activity of 1-(2-furyl)-1-hexene-4-yn-3-one is 2 to 10 times greater than that of 1-phenyl-4-hexene-1-yn-3-one and 2 to 80 times greater than that of the 1,5-diphenyl-4-pentene-1-yn-3-one.

EXAMPLE 3

(A) Preparation of 1-(2-furyl)-1-heptene-4-yn-3-one.—The magnesium derivative of 1-butyne is first prepared by bubbling butyne into an ethereal solution of magnesium ethyl bromide maintained at 30° C. and obtained from 13.4 g. of magnesium, 68.5 g. of ethyl bromide and 400 ml. of anhydrous ether.

A return condenser, cooled with Dry Ice-acetone, refluxes the butyne and permits the ethane to be evolved. When the flow of ethane is over, the excess butyne is removed and the remainder is allowed to return to room temperature.

61 g. of furylacrolein, dissolved in 400 ml. of anhydrous ether, are added slowly at room temperature. The mixture is heated at reflux for 3 hours, cooled in a salt-ice cooling bath and than hydrolyzed with a saturated solution of ammonium chloride.

It is extracted with ether. The ethereal solution is washed with water, dried over sodium sulfate and then the ether is eliminated. 79 g. of raw 1-(2-furyl)-1-heptene-4-yn-3-ol are obtained corresponding to a yield of 89.5% by weight of theory.

79 g. of the product above are progressively added from solution in 100 ml. of acetone into a suspension of 790 g. of active MnO₂ in 7.9 liters of acetone which has previously been distilled over MnO₄K. The mixture is agitated at room temperature for 8 hours and then filtered. The filtrate is dried over sodium sulfate and the solvent is then eliminated. The raw ketone is purified by evaporation under vacuum.

27.5 g. of 1-(2-furyl)-1-heptene-4-yn-3-one having a refraction index of 1.612 at 19° C. are obtained, corresponding to a yield of 35% by weight of theory.

(B) The antifungal activity of 1-(2-furyl)-1-heptene-4-yn-3-one was determined over *Candida albicans, Scopulariopsis brevicaulis, Trichophyton interdigitale, Cercospora melonis, Glomerella cingulata* and *Macrophomina phascoli,* using the technique described in Example 2–B.

For comparison and to illustrate the merits of this invention, identical tests were carried out with 1,5-diphenyl-4-pentene-1-yn-3-one and with 1-phenyl-4-hexene-1-yn-3-one, as the active compound.

On each test, the minimal concentration of compound required completely to inhibit the growth of the microorganisms after 10 days of incubation at 28–30° C. was determined. These determinations are set forth in the following table:

| Parasites | Minimal concentrations of— | | |
|---|---|---|---|
| | 1-(2-furyl)-1-hexene-4-yn-3-one | 1,5-diphenyl-4-pentene-1-yn-3-one | 1-phenyle 4-hexene-1-yn-3-on |
| *Candida albicans* | 1/4,000 | >1/1,000 | 1/4,000 |
| *Scopulariopsis brevicaulis* | 1/20,000 | >1/1,000 | 1/4,000 |
| *Trichophyton interdigitale* | 1/80,000 | >1/1,000 | 1/40,000 |
| *Cercospora melonis* | 1/20,000 | 1/1,000 | 1/4,000 |
| *Glomerella cingulata* | 1/10,000 | 1/1,000 | |
| *Macrophomina phascoli* | 1/10,000 | 1/1,000 | |

It will be seen that the antifungal activity of 1-(2-furyl)-1-heptene-4-yn-3-one is 1 to 5 times greater than that of 1-phenyl-4-hexene-1-yn-3-one and 4 to 80 times greater than that of 1,5-diphenyl-4-pentene-1-yn-3-one.

It will be apparent from the foregoing that we have produced and provided a method for producing new and improved ketonic compounds which, when used as parasiticides, exhibit unexpectedly great antifungal activity.

It will be understood that changes may be made in the details of formulation and methods of operation without departing from the spirit of the invention, especially as defined in the following claim.

What is claimed is:
1. A compound of the formula

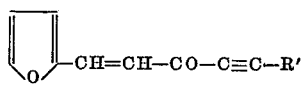

in which R' represents a group selected from the group consisting of a lower alkyl, phenyl, indenyl, naphthyl and anthracenyl nad substituted phenyl, indenyl, naphthyl and anthracenyl groups in which the substituent is selected from the group consisting of alkyl, halogeno, trihalogeno, trihalomethyl, hydroxyl, alkoxyl, amino, amido, dialkylamino, dialkylamide and nitro groups.

References Cited

UNITED STATES PATENTS

Vaitiekunas et al., J. Org. Chem., vol. 16, pp. 1603 to 1609 (1951).

Chauvelier et al., Bull. Soc. Chim., France, 1954, pp. 734 to 739.

Normant et al., Comptes Rendus, vol. 250, pp. 722 to 724 (1960).

Vereshchagin et al., J. Org. Chem. (U.S.S.R.), vol. 1, pp. 962–3 (May 1965).

Nash et al., J. Chem. Soc., 1965, pp. 2983 to 2988 (April).

JOHN D. RANDOLPH, Primary Examiner

U.S. Cl. X.R.

260—248, 250, 289, 297, 302, 307, 308, 309, 326.16, 347.8, 665; 424—249, 258, 269, 270, 272, 273, 274, 275, 285